US010374995B2

(12) United States Patent
Lewin-Eytan et al.

(10) Patent No.: US 10,374,995 B2
(45) Date of Patent: Aug. 6, 2019

(54) METHOD AND APPARATUS FOR PREDICTING UNWANTED ELECTRONIC MESSAGES FOR A USER

(71) Applicant: OATH INC., New York, NY (US)

(72) Inventors: Liane Lewin-Eytan, Binyamina (IL); Guy Halawi, Ramat Gan (IL); Dotan Di Castro, Haifa (IL); Zohar Karnin, Herzelia (IL); Yoelle Maarek, Haifa (IL); Michael Albers, Menlo Park, CA (US)

(73) Assignee: OATH INC., New York, NY (US)

( * ) Notice: Subject to any disclaimer, the term of this patent is extended or adjusted under 35 U.S.C. 154(b) by 541 days.

(21) Appl. No.: 14/755,518

(22) Filed: Jun. 30, 2015

(65) Prior Publication Data
US 2017/0005962 A1 Jan. 5, 2017

(51) Int. Cl.
*H04L 12/58* (2006.01)

(52) U.S. Cl.
CPC ............... *H04L 51/12* (2013.01)

(58) Field of Classification Search
CPC ................................ H04L 51/12
See application file for complete search history.

(56) References Cited

U.S. PATENT DOCUMENTS

| 8,291,024 | B1* | 10/2012 | Cheng | G06Q 10/107 709/206 |
| 2008/0313704 | A1* | 12/2008 | Sivaprasad | H04L 51/12 726/2 |
| 2009/0287618 | A1* | 11/2009 | Weinberger | G06N 99/005 706/10 |
| 2010/0174788 | A1* | 7/2010 | Vitaldevara | G06Q 10/107 709/206 |
| 2010/0211641 | A1* | 8/2010 | Yih | G06F 15/16 709/206 |
| 2011/0246584 | A1* | 10/2011 | Vitaldevara | G06Q 10/107 709/206 |
| 2013/0325991 | A1* | 12/2013 | Chambers | H04L 51/12 709/206 |

\* cited by examiner

*Primary Examiner* — Nicholas R Taylor
*Assistant Examiner* — Sanjoy K Roy
(74) *Attorney, Agent, or Firm* — James J. DeCarlo; Greenberg Traurig, LLP

(57) ABSTRACT

As is disclosed herein, user behavior in connection with a number of electronic messages, such as electronic mail (email) messages, can be used to automatically learn from, and predict, whether a message is wanted or unwanted by the user, where an unwanted message is referred to herein as gray spam. A gray spam predictor is personalized for a given user in vertical learning that uses the user's electronic message behavior and horizontal learning that uses other users' message behavior. The gray spam predictor can be used to predict whether a new message for the user is, or is not, gray spam. A confidence in a prediction may be used in determining the disposition of the message, such as and without limitation placing the message in a spam folder, a gray spam folder and/or requesting input from the user regarding the disposition of the message, for example.

45 Claims, 6 Drawing Sheets

| Field | Sender | Sender Domain/IP | Recipients | Subject | Body |
|---|---|---|---|---|---|
| Local, Action Independent | # of inbox msg w/ similar sender | # of inbox msg w/ similar sender domain/IP as above, cross action | # of inbox msg w/ similar recipients | # of inbox msg w/ similar subject | # of inbox msg w/ similar body words |
| Local, Action Dependent | traffic sent/received by sender, reply traffic sent to/from sender, ratio business traffic sent & received by sender, sender latent category | | as above, cross action | as above, cross action | as above, cross action |
| Global, Action Independent | sender traffic, sender reply traffic, empty business traffic | | sender traffic with similar # of recipients | sender traffic with similar subject words, sender traffic sent as burst | sender traffic with similar body words |
| Global, Action Dependent | cross action, sender traffic triggering a specific action | | | | |

Fig. 2

METHOD AND APPARATUS FOR PREDICTING UNWANTED ELECTRONIC MESSAGES FOR A USER

FIELD OF THE DISCLOSURE

The present invention relates generally to managing messages, such as electronic mail, or email, messages, and more particularly to predicting a user's unwanted, non-malicious messages, also referred to herein as gray spam

BACKGROUND

Electronic communications, such as electronic messages including electronic mail messages, have become a primary means of communication among computer users. Users receive a number of electronic mail, or email, messages, for example. The email messages are typically stored in a mail folder, such as an inbox folder. The user accesses messages via an application, such as a browser, a messaging client, etc. Typically, the user is provided with a listing of new messages.

SUMMARY

Messages directed to a user may include messages that the user wants, as well as messages that the user does not want. Unwanted messages might be known spam, such as messages known to be malicious, which can be filtered out before they are even made available to the user. Some unwanted messages may not be malicious or known spam, and therefore are not filtered out and are made available to the user, e.g., in the user's inbox, along with the user's wanted messages. The user is then faced with the options of taking some type of action on these unwanted messages or simply trying to ignore them. If ignored, the unwanted messages can accumulate and result in difficulties in accessing wanted messages, e.g., the unwanted messages may result in an inbox containing a large number of messages with the wanted message intermingled amongst the unwanted messages.

A user may consider mail messages originating from legitimate senders as spam. By way of some non-limiting examples, social or promotion messages (e.g. from Facebook®, Groupon®, etc.), may be considered spam by some users, yet considered to be non-spam by others. Messages considered spam by some users while being considered to be non-spam by other users may be referred to as "subjective spam" or "gray spam."

Blocking the messages from a sender or domain for all users based on the subjectivity of some users that consider the messages to be spam, is a crude and ineffective approach, since some users may wish to receive the messages from the domain or sender. Alternatively, not blocking the messages for the users that consider the messages to be spam ignores such users' considerations, which can easily result in them becoming frustrated. Embodiments of the present disclosure can be used to identify a sender's message as a "subjective spam" or "gray spam" message for the users that consider it to be spam without blocking the sender's message from reaching other users that consider the message to be non-spam.

Consider, for example, a user that does not want to receive any form of notification from Facebook® other than a message sent directly to her. Since Facebook® mass message contain a random string rather than a sender identifier, attempts to block messages based on the sender is not effective. On the other extreme blocking the entire domain may filter both unwanted messages as well as wanted messages. After two or three such spam votes by a user in an unsuccessful attempt at trying to receive only those messages sent directly to her, the Facebook® user will become frustrated and not understand why the mail system does not act on the feedback she provides.

From the perspective of a legitimate sender or domain, spam votes by users not interested in the messages from the sender or domain may accumulate and result in the sender or domain being considered to be a spam sender or spam domain and potentially having their messages flagged as spam for all of the users. Embodiments of the present disclosure can be used to filter spam votes on legitimate senders or domains, and spare a system, such as and without limitation a spam engine or other system, subjective spam votes, e.g., spam votes based on user subjectivity leading to non-spam messages, senders, domains, etc. being identified as spam.

By way of a non-limiting example, embodiments of the present disclosure provide an ability to mark a message as gray spam, or subjective spam, for one or more users using each user's personalized predictor(s), thereby avoiding an accumulation of black spam votes that might otherwise be cast by such users on a legitimate sender or domain and avoiding a legitimate sender or domain being identified as a spam sender or domain as a result of such an accumulation of black spam votes. Embodiments of the present disclosure can be used, e.g., by a spam engine or other system, to automatically identifying messages as gray spam and avoid identifying the message, sender domain, etc. as spam.

By way of a further non-limiting example, a sender or domain previously identified to be a spam sender or spam domain can be identified as a legitimate sender or domain in the presence of users' "spam subjectivity." A white list may be updated to identify a sender or domain as a legitimate, non-spam sender.

One or more embodiments of the present disclosure learn from a given user who casts spam votes, even infrequently, in order to identify messages that the user does not wish to receive, e.g., unwanted messages, subjective spam, or gray spam. Various options are provided, including removing gray spam from the user's inbox, in response to identifying the user's gray spam for the user. Advantageously, the user is provided with an enhanced messaging, e.g., email messaging, experience and the amount of erroneous spam votes, which would otherwise be used in identifying spam, is reduced. By distinguishing between gray and black spam, anti-spam mechanisms can learn from black spam votes only, and thus reduce the risk of labeling as spammer a non-malicious sender. In addition, gray spam signals may be used to detect legitimate senders that can be automatically added to a white list.

In accordance with one or more embodiments of the present disclosure, a prediction is made for a user and a message whether or not the user wants the message, and one or more actions may be taken with respect to the message based on the prediction. By way of some non-limiting examples, a message that is estimated to be unwanted by the user may be moved to a spam folder, such as a gray spam folder, etc. By moving the predicted gray spam to a separate folder, they can be differentiated from other messages in the user's inbox that are of interest to the user, i.e., wanted messages, and the user can peruse wanted message separate from unwanted messages, if the user even wishes to peruse the unwanted messages. Other actions are also possible, such as and without limitation, updating a white list identifying legitimate senders, opening a dialogue with the user, e.g., the dialogue may ask the user whether or not the user would like to filter similar messages, where similarity can be defined in various ways, such as and without limitation messages with one or more message fields with the same or at least similar content may be considered to be similar.

In accordance with one or more embodiments, a method is provided, the method comprising generating, by a computing device and for a user, training data using a plurality of the user's electronic mail messages and the user's behavior with respect to the user's plurality of electronic mail messages; generating, by the computing device and for the user, a gray spam predictor personalized for the user using the user's training data; automatically making a prediction, by the computing device and for the user, whether or not a new electronic mail message of the user is unwanted by the user using the gray spam predictor personalized for the user, and automatically performing, by the computing device and for the user, at least one operation on the new electronic mail message if the prediction indicates that the new electronic mail message is unwanted by the user.

In accordance with one or more embodiments a system is provided, the system comprising at least one computing device, each computing device comprising a processor and a storage medium for tangibly storing thereon program logic for execution by the processor, the stored program logic comprising generating logic executed by the processor for generating, for a user, training data using a plurality of the user's electronic mail messages and the user's behavior with respect to the user's plurality of electronic mail messages; generating logic executed by the processor for generating, for the user, a gray spam predictor personalized for the user using the user's training data; prediction making logic executed by the processor for automatically making a prediction, for the user, whether or not a new electronic mail message of the user is unwanted by the user using the gray spam predictor personalized for the user; and preforming logic executed by the processor for automatically performing, for the user, at least one operation on the new electronic mail message if the prediction indicates that the new electronic mail message is unwanted by the user.

In accordance with yet another aspect of the disclosure, a computer readable non-transitory storage medium is provided, the medium for tangibly storing thereon computer readable instructions that when executed cause at least one processor to generate, for a user, training data using a plurality of the user's electronic mail messages and the user's behavior with respect to the user's plurality of electronic mail messages; generate, for the user, a gray spam predictor personalized for the user using the user's training data; automatically make a prediction, for the user, whether or not a new electronic mail message of the user is unwanted by the user using the gray spam predictor personalized for the user; and automatically perform, for the user, at least one operation on the new electronic mail message if the prediction indicates that the new electronic mail message is unwanted by the user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview of a process flow for use in accordance with one or more embodiments of the present disclosure.

FIG. 2 provides a table illustrating some examples of local and global features.

FIG. 3 provides a user interface example including a dialog for use in accordance with one or more embodiments of the present disclosure.

FIG. 4 provides a user interface example including a gray spam folder for use in accordance with one or more embodiments of the present disclosure.

DETAILED DESCRIPTION

Figure 1:
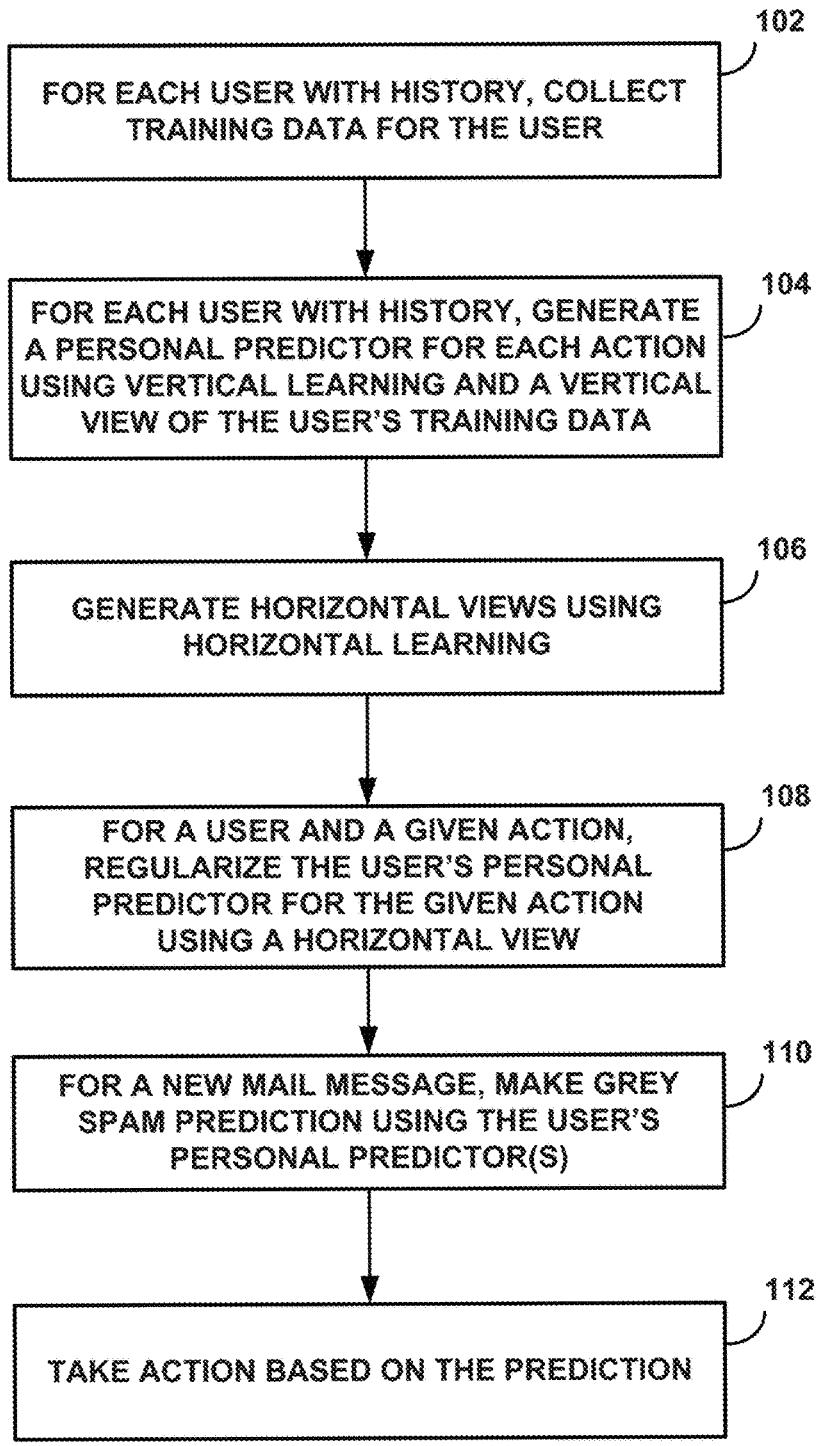

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a." "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a gray spam identification system, method and architecture. User behavior in connection with a number of electronic messages, such as electronic mail (email) messages, can be used to automatically learn from, and predict, whether a message is wanted or unwanted by the user, where an unwanted message is referred to herein as gray spam. A gray spam predictor is personalized for a given user in vertical learning that uses the user's electronic message behavior and horizontal learning that uses other users' message behavior. The gray spam predictor can be used to predict whether a new message for the user is, or is not, gray spam. A confidence in a prediction may be used in determining the disposition of the message, such as and without limitation placing the message in a spam folder, a gray spam folder and/or requesting input from the user regarding the disposition of the message, for example.

FIG. 1 provides an overview of a process flow for use in accordance with one or more embodiments of the present disclosure. In accordance with one or more embodiments of the present disclosure, the process flow may be implemented as part of a mail server, data center server, etc. capable of servicing hundreds of millions of users and the users' electronic messages, which collectively can amount to multiple terabytes of stored electronic messages with large users having thousands of electronic messages, and each message may comprise multiple kilobytes of data. The services provided by such a server, or servers, including processing each electronic message directed to each such user to automatically identify unwanted messages for each such user.

At step 102, for each user having a history of acting on messages, training data is obtained for the user. By way of a non-limiting example, each user's historical information and actions on messages received by the user, e.g., the user's actions with respect to messages in the user's inbox can be used to generate the user's training data. Such actions may include without limitation the user's spam vote history as well as other history such as and without limitation the user's "ham," or non-spam vote, read, delete after reading, delete without reading, star, mark, unmark, move-to-folder, reply, forward, report as spam etc. history. These are just some examples of types of historical data that may be collected for a given user in connection the user's electronic messages. Historical data with in connection with other actions are also contemplated, including any action, or actions, that may be used as an indicator of message relevance to the user. In addition to collecting training data for a given user, training data is also collected for a number of other users with a history, e.g., with historical data. One or more actions taken by a user, or users, with respect to one or more messages may be referred to as behavior of the user(s).

In generating training data for a given user, a set of features, or a vector of features, may comprise local features, which can be determined or computed over the content of a user's inbox, actions of the user, metadata of the messages etc. and global features, which can be determined over a corpus of users and a mail dataset corresponding to the corpus of users. By way of some non-limiting examples, local features may comprise features derived from the message content and header and features that reflect the behavioral pattern of the user over the messages used for the training data set, and global features may refer to an overall data set over the corpus of users. By way of a non-limiting example, global features may comprise information about large senders, such as and without limitation an overall number of messages sent by a specific sender across the corpus of users, the number of actions triggered in response to the sender's messages across all users, as well as other information determined from the corpus data set.

In accordance with one or more embodiments, step 102 may be performed periodically, such as and without limitation on a daily basis, to update the data set, and the updated data set may be used for learning purposes, e.g., to update one or more user's gray spam predictor trained using a previous training data set.

In accordance with one or more embodiments, the training data set may comprise binary label identifying whether an action has been taken by the user on the message. The binary label is associated with the message's feature vector. By way of a non-limiting example, for spam, the binary label indicates whether or not the message was marked as spam by the user.

In accordance with one or more embodiments, a feature vector comprises features derived from a number of the fields of a message. By way of some non-limiting examples, features can be derived from the message header (covering header fields such as sender including domain and associated IP, cc, "subject", etc.), from the message body and also additional metadata fields provided by the mail service such as URLs included in the body.

The feature vector may comprise both local and global features. FIG. 2 provides a table illustrating some examples of local and global features. Local features are generated using messages from a given user's inbox as well as the way the user reacted to such messages in the past. The way the user reacted to a message may include one or more actions taken by the user on the message.

Local features pertaining to fields of a message, m, can be classified as action independent features and action dependent features. Local action independent features can be based on a specific field and can indicate whether the user previously received messages with a similar value of the field. Both a binary and scalar version of the feature may be maintained. The binary feature holds a value of zero or one reflecting whether or not the user received such a message in the past, and the value of the scalar feature holds the count of messages received over a given period of time that have the same of a similar value for the field, or fields, used in generating a given action independent feature. By way of a non-limiting example, given the sender field of info@twitter.com, the binary feature associated with the sender field indicates whether at least one other message was received from the info@twitter.com sender by the user in the past, and the scalar feature reflects the count of messages received from this sender.

Local action dependent features can be based on a specific field and a given action that might be performed on, or in connection with, the message. By way of a non-limiting example, given a message received at time t by a user and sent by a sender, each action that may or may not be performed by the user on the message may have a corresponding feature indicating whether or not the user performed the action on the message, and/or other messages, sent by the same sender. Both a binary and scalar version of the feature may be maintained.

Global features relate to the message sender, and can be used to characterize the manner in which a number of users, as a collective, react to messages sent by the same sender. Global features may comprise general traffic sender features, conditioned sender traffic features, and a sender latent category feature.

General traffic sender features may comprise absolute and relative counts of messages exchanged between a given sender and the recipient population, including traffic features providing absolute and relative counts of messages both sent and received by the sender, and reply traffic features providing relative counts, which may be expressed as percentages, of messages sent as reply messages, either by or to the sender. A feature may also be maintained indicating a ratio between the number of messages that the sender sent to users, and the number of messages it received from email users.

Conditioned sender traffic features include features representing various types of sender traffic information, conditioned by certain attributes. Such features may include without limitation a sender traffic, conditioned by action feature, a sender traffic, conditioned by textual content feature, a sender mass traffic feature and a sender burst traffic feature. The sender traffic conditioned by action feature provides, for a given sender, total and relative counts across a number of users of sent messages that triggered a specific action.

The sender traffic, conditioned by contextual content feature provides, for a given sender, total and relative counts of sent messages that include some specific words in the body of the messages. By way of a non-limiting example, such words may include "unsubscribe." "free," "delivered," etc. Such words may be considered, with high probability, to be indicators of message types with gray spam potential, such as newsletters, promotions, purchases, etc. The sender mass traffic feature provides, for a given sender, total and relative counts of the messages sent by the sender to more than one recipient. The sender burst traffic feature provides, for a given sender, a relative counts of messages sent by the sender in a burst, which may comprise messages with similar subject sent over a small time interval. It is been observed that bursts are quite frequent among mass senders of machine-generated email, such as for promotion campaigns.

Each sender may have a sender latent category feature, or a global semantic feature, identifying a sender's category, or categories, such as and without limitation, finance, shopping, social, travel, career and personal communication. In accordance with one or more embodiments, a sender's category can be determined using a classification approach, or a null value may be used if a sender's category cannot be determined.

Referring again to FIG. 1, at step 104, vertical learning is used to generate a personal predictor trained for a given user using a vertical view of training data, which focuses on the user's messages and actions, or inactions, taken by the user on the user's messages. In accordance with one or more embodiments, a personal predictor may be generated for the user for each of a number of actions. The vertical learning uses local features generated based on messages and the action(s) taken by the user with respect to the messages and uses a number of global features, such as those providing information about senders of messages in the user's inbox.

In accordance with one or more embodiments, the learning, including vertical learning, performed makes use of labeled samples, each of which comprises a feature vector and a label comprising a binary indicator of whether or not a given action was taken by the user on a message used to generate the feature vector. A feature vector may comprise local and global features. A labeled sample may be generated for each action being tracked. In accordance with one or more embodiments, a labeled sample generated indicating whether or not the user deleted a message without reading it comprises local and global features for the message and a binary value of 0, if the user did not delete the message, or a 1, if the user deleted the message. For a given user and message, a labeled sample can be generated for each user action being tracked, e.g., spam vote, read, reply, delete, etc.

By way of a non-limiting example, for a given user, each message for the user and each action with respect to the user and message, a sample can be generated and associated with a binary value, e.g., 0 or 1, based on observations about actions taken by the user with respect to the message. By way of a further non-limiting example, if the user is observed taking a given action on a message, a sample is generated with an associated binary value of 1 reflecting that the user was observed taking the action; and conversely, if the user is not observed taking the given action on the message, a sample with an associated binary value of 0 may be used to reflect that the user was not observed taking the action on the message.

Thus, a stream of messages received by the user can be transformed into a stream of samples, which may be ordered by time, each sample may be created, or generated, after some time interval. By way of a non-limiting example, vertical learning may be ongoing, such that vertical learning is performed using a first training data set comprising a set, or batch, of samples, and then retrained using the first set of samples as well as a new set, or batch, of samples.

In accordance with one or more embodiments, a vertical learning process may be used to train a personalized predictor for a user, each personalized predictor corresponding to a given action, e.g., read, reply, forward, spam, delete and delete without read. In accordance with such embodiments, the vertical learning is performed to train a model using a given user's samples, which may be generated using the user's inbox and observed actions, together with some features, such as and without limitation the rate of reply to message sent by a sender, e.g., a sender of a message in the user's inbox, which rate of reply may be considered to be global and contain data obtained from different inboxes. For each user and action, a personal predictor may be trained using both positive and negative samples for a given action from the user's training data set. In accordance with one or more embodiments, logistic regression may be used to train the model. In accordance with one or more embodiments, a user's personal predictor for a given action comprises a coefficient vector generated using samples determined from the user's inbox.

Each user may vary from one or more other users with respect to the amount, or sufficiency, of observed history. By way of a non-limiting example, one user may be less active with only a few actions, or may be a new user with a small inbox, while another user may be more active. As yet a further non-limiting example, one user may be more active with respect to one action and less active with respect to another action. A light user is used herein to refer to a user with a number of occurrences for a given action below some threshold.

In accordance with one or more embodiments, horizontal learning uses data collected from a number of users. One or more such embodiments consider two types of horizontal learning and select a one or the other type for a given user based on whether or not the user, for a given action, is a light or active user. A user may be a light user for one action and a heavy user for another action. The type of horizontal learning that is performed for a given user is selected based on whether or not the user is a light user, e.g., whether or not the user is a light user for a given action for which horizontal learning is being performed. An average user horizontal learning may be used for a light user and a latent user-type horizontal learning may be used for an active user. By way of a non-limiting example, a number, e.g., 23, might be used as a threshold in determining whether a user is a light user or an active user.

At step 106, horizontal learning is performed to generate one or more horizontal models using training data comprising samples from a number of different user inboxes. In accordance with one or more embodiments, horizontal learning performed at step 106 comprises an average user horizontal learning, which is performed for use with light users, and a latent user-type horizontal learning, which is performed for active users.

At step 106, an average user horizontal model for each action can be trained using horizontal learning on samples, e.g., a number of positive and negative samples, from the inboxes of a number of users to generate an average inbox. The positive samples represent messages that triggered the given action and the negative samples represent messages that did not trigger the given action. By way of a non-limiting example, the samples can be identified by applying a uniform sampling over the users and applying a uniform sampling over their messages. An average user predictor can be for each action based on the average inbox generated for the action.

A latent user-type horizontal model can be generated, at step 106. In accordance with one or more such embodiments, the personal predictors of users having a rich data set for a given action may be grouped according to their coefficient vectors, e.g., the coefficient vectors generated in generating the personal predictors for each user. By way of a non-limiting example, for each action, a number of users having at least certain number of positive and negative samples used in generating their personal predictor for the given action are selected, and their respective coefficient vectors are grouped, or clustered, e.g., using a k-means++ approach to yield a number, e.g., 8, groups, or clusters. For each group, a latent type predictor is determined such that the coefficient vector for the latent type predictor corresponds to a center of the corresponding group.

At step 108, a user's personalized predictor generated at step 104 can be regularized using either the average user horizontal model, if the user is a light user, or the latent user-type horizontal model, if the user is an active user, where both the average and latent user-type modes are trained at step 106. Such regularization of the user's personalized predictor results in the user's personalized predictor reflecting one of the horizontal models. By way of a non-limiting example, the user may be considered to be an active user with respect to an action if the number of observed examples of the action in the user's training set is at least equal to a threshold number, such as and without limitation twenty-three samples. A light user may be a user whose observed examples is less than the threshold number, for example.

In the case of an active user, the user's latent user-type may be identified using a group to which the user is determined to belong. By way of a non-limiting example, a k-means approach may be used in determining an appropriate group, or cluster, e.g., a distance may be determined between the coefficient vector of the user's personal prediction for a given action and the latent type predictor determined for each group for the given action. The latent user-type for a given user and action can be identified as the latent user-type whose coefficient vector with the minimum determined distance from coefficient vector of the user's personal predictor. The user's updated, or regularized, personal predictor, which may be expressed as a coefficient vector, for a given action, may be learned using a regularization, which is performed using the determined distance from the latent user-type selected for the user and the user's personal predictor. An optimization process may be used to update, or regularize, the user's personal predictor to take into account the horizontal view of the training data across a number of users. The coefficient vector for the user's regularized, or updated, personal predictor may be determined using an optimization process in which each coefficient is determined while minimizing loss, which may be expressed as:

$$\mathbb{E}_{x,y}[\text{Loss}(w,x,y)+\lambda\|w\|], \qquad \text{Equation (1)}$$

where Loss(w, x, y) describes the loss inferred by choosing the personal predictor's coefficient vector, w, for example x with label y, $\|w\|$ describes a norm of w, which might be set to L1 or L2 for example, and $\lambda$ is a regularization parameter. By way of a non-limiting example, in the case of logistic regression, Loss(w, x, y)=$\log(1+e^{y\langle w,x\rangle})$, for y∈{−1,1}.

An active user may be defined to be a user with a number of observed examples for a given action that is at least equal to a threshold number, such as and without limitation 23 examples. The active user's latent user-type is determined based on the group, or cluster, to which the user belongs, which may be identified as the group with the minimum distance to the user's personalized predictor relative to the other group's determined distances, where each distance is determined using the group's coefficient vector and the user's personal predictor's coefficient vector. The optimization may expressed as:

$$\mathbb{E}_{x,y}\left[\text{Loss}(w, x, y) + \min_{w_0\in C}\lambda(n_i, a)\|w-w_0\|\right], \qquad \text{Equation (2)}$$

where $n_i$, a is the number of observed actions of type a performed by the user i during a training data collection period, C is the set of coefficient vectors corresponding to latent user-type coefficient vectors, and the norm is the L2 norm. Regularization can be performed using the determined distances from the latent type predictor and an optimization function. The result of the regularization is a personal predictor for a given action and user, trained using data from the user's training data, e.g., messages from the user's inbox and action or inaction by the user with respect to the messages, and optimized using samples from a number of other users.

In the case of an inactive, or less active, user, regularization can be performed using the average user horizontal model in place of the latent user-type, together with the user's personal predictor to update the user's personal predictor to reflect data collected from other users. An optimization function may be used to generate the user's updated, or regularized, personal predictor. The inactive user's regularized, personal predictor may be a combination of the user's personal predictor and the average user horizontal predictor.

In accordance with one or more embodiments, step 108 results in regularized predictors for each action personalized for a given user. One or more of the regularized personal predictors for a given user may then be used to make a prediction, at step 110, whether a message, e.g., a new email message, is wanted or unwanted by the user. By way of a non-limiting example, a user's personal predictor for one or more actions may be used to make a prediction whether a new message is gray spam. By way of a further non-limiting example, the new message may be used to determine a feature vector, which may be input to the user's personal predictors for a given action to predict whether or not the user is likely to take, or not take, the given action on the new message. By way of a further non-limiting example, the user's report-as-spam personal predictor may be used to determine whether the user is likely to mark the new message as spam, the user's delete without reading personal predictor may be used to determine whether the user is likely to delete the message without reading, the user's read personal predictor may be used to determine whether or not the user is likely to read the new message, etc.

For a given user, each personal predictor is trained for a given action. Indicators for an action, such as and without limitation a gray spam action, comprise a set of features. For purposes of training a given action's personal predictor, a label can be associated with the set of features determined for a message, where the label specifies whether or not the user took the given action in connection with the message. For a new message, a personal predictor trained for a given action may be used, together with the message's features, to make a prediction as to the likelihood, or probability, that the user will take the given action in connection with the message. In other words, each predictor can be used to predict its corresponding action on a message, e.g., a newly-received message.

By way of a non-limiting example, a gray spam predictor can be used to predict a probability, or likelihood, that the user will consider the new message to be gray spam. By way of some further non-limiting examples, a personal predictor trained for a user in connection with the read action can be used to predict the probability, or likelihood, that the user will read the new message, and a personal predictor trained for the user in connection with the delete-without-reading action can predict the probability, or likelihood, that the user will delete the message without reading the message. Where a personal predictor trained for the read action makes a prediction that the user will read a new message, the new message is likely not gray spam or spam. On the other hand, where a personal predictor trained for the delete-without-reading action makes a prediction that the user is likely to delete the new message without reading it, the new message may be considered to be gray spam. In accordance with one or more embodiments, a personal predictor trained for the gray spam action to make a prediction that the user will consider the message to be gray spam can be used as a main predictor of gray spam, e.g., a main predictor that the new message is gray spam.

By way of a non-limiting example, sufficient probability may be determined by comparing the predicted probability generated by the user's personal predictor to a threshold probability to determine whether the predicted probability is at least equal to the threshold probability. By way of some further non-limiting examples, a prediction indicating with sufficient probability that the user is likely to report the message as spam may be an indicator that the message is at least gray spam, and where the probability exceeds a certain confidence threshold, the message may be considered to be both unwanted by the user and is to be treated as spam, e.g., moved to a regular spam folder. If the message is considered to be gray spam, various options are available for handling the message as gray spam.

At step 112, one or more actions can be taken based on the prediction made at step 110. In accordance with one or more embodiments, messages identified as gray spam using one or more of the user's personal predictors can be handled in different manners, and the manner selected may be based on a level of confidence that the message is gray spam, and/or is spam.

By way of some non-limiting examples, a medium confidence that the message is spam may be handled by initiating a dialog with the user, possibly upon the user casting a spam vote on the message, requesting the user to indicate whether the user would like similar messages to be automatically moved to a gray spam folder, deleted, etc. in the future. A message identified as being spam with a good confidence level may be automatically moved to a gray spam folder, which is can be separate from a black, or known, spam folder. A message identified as spam with a level confidence satisfying a confidence threshold might be automatically moved to a known spam folder, and may optionally include an indicator identifying that the message was automatically identified as spam.

In accordance with one or more embodiments, the vertical learning performed at step 104 uses a vertical view of email data, which focuses on a given user's individual inbox and supports personalization, and the horizontal learning performed at step 106 uses a horizontal view of email across a number of users. In the vertical learning process, historical data can be derived from a given user's inbox considering both local and global features to predict a spam vote on a new message. In the horizontal learning process, a model may be trained on an average spam voter computed using a number of users' inboxes and actions, which average spam voter represents the average behavioral patterns of users. A personal predictor determined for each user may be regularized using an average user horizontal model or a latent user type horizontal model to leverage the horizontal learning. In accordance with one or more embodiments, a weight of the regularization may be tuned, e.g., inversely, according to the spam vote active nest of the user, e.g., the size of the user's spam vote historical data.

Embodiments of the present invention may consider any number of action types in identifying unwanted messages. In accordance with one or more such embodiments, a single action type, such as a spam voting action, may be used in identifying unwanted messages.

In accordance with one or more embodiments, one or more personalized gray spam filters may be applied. By way of a non-limiting example, message identified as gray spam for a given user may be clustered, such that messages assigned to a given cluster have one or more similarities. By way of some non-limiting examples, a cluster may be formed for messages originating from a specific sender, such as and without limitation "noreply@abc.com," for messages from a generalized sender such as "[1-9] {32}@aa.com," messages originating from a regular expression, or regex, over the domain and subject line such as "amazon.com[new deal].*" etc. In accordance with one or more such embodiments, optional clusters of messages may be identified by combining rules with respect to one or more metadata fields such as the sender, domain, subject regex, etc., and/or a combination of metadata fields.

In accordance with one or more such embodiments, an identified cluster can characterize a type of unwanted, or gray spam, messages, for a given user, and the identified cluster may have one or more associated filters for filtering messages that are of the type identified by the cluster.

Clusters may be ranked and the cluster ranking may be used in selecting a cluster, and the cluster's associated filtering, for a new message. By way of a non-limiting example, clusters may be ranked based on a measure of the cluster's quality, which may be determined by a percentage of gray spam messages that it captures for a given user, and the clusters may be ranked according to each one's determined quality. In addition or alternatively, clusters may be ranked based on each one's respective specificity. Of course, any approach may be used in ranking clusters. The ranking may be used in selecting one of a number of clusters matching a message, e.g., a new message, for which a prediction is being generated. By way of a non-limiting example, the highest ranking cluster matching the message may be selected and one or more filters associated with the selected cluster may be applied, or suggested, to the message.

In accordance with one or more embodiments, filters may be content sensitive, and need not be rely exclusively on values of common fields, such as sender and domain, used for spam filtering. In addition, a message from a sender could be filtered as gray spam from a user's inbox. By way of way of a non-limiting example, such gray spam filtering can be triggered by a spam vote. It is possible that the gray spam filtering could occur absent a previous spam vote on the sender by the user.

In accordance with one or more embodiments, filtering may be used in cases where there is a sufficient level of confidence that a message is gray spam. Where the level of confidence is not sufficient, a dialogue can be initiated with the user. By way of a non-limiting example, there may be an insufficient level of confidence in a prediction made as a result of the horizontal learning performed in accordance with one or more embodiments, which takes into account actions by a number of users over a number of inboxes, in which case a dialogue could be initiated with a user.

Figure 3:
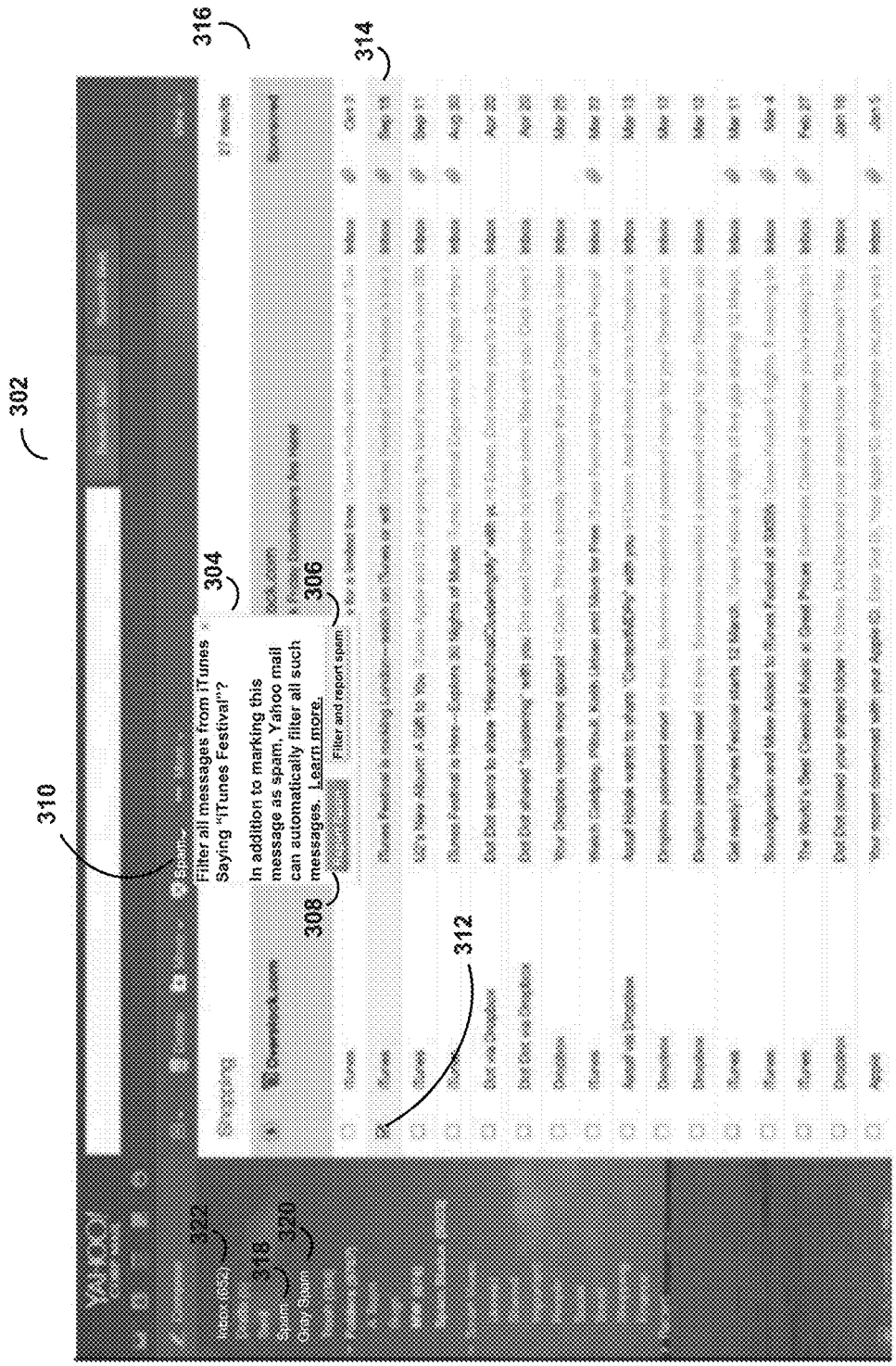

FIG. 3 provides a user interface example including a dialog for use in accordance with one or more embodiments of the present disclosure. In the example shown in FIG. 3, user interface (UI) 302 includes a message display portion 316, which presents the user's messages as a list. UI 302 comprises a messaging UI providing the user with an ability to perform various messaging operations, including without limitation read, compose, send, delete, etc. operations on one or more messages displayed in the message display portion 316. In addition, UI 302 provides an ability to select, from messages displayed in display portion 316 of UI 302, a message 314, such as and without limitation by clicking on, or otherwise selecting, box 312 corresponding to message 314. Box 312 displays a check mark in response to the clicking input received from the user. The user may identify the message as spam using pull down menu 310 entitled "Spam", for example. In response, a dialog 304 is displayed. Dialog 304 provides the user with the ability to filter new messages having attributes similar to the selected message 314. In the example shown in FIG. 3, the dialog 304 allows the user to select control 308 to report the selected message 314 as spam or to select control 306 to report message 314 as spam and to filter new messages that are similar to message 314. As indicated in dialog 304, new messages from the sender, e.g., iTunes®, containing the phrase "iTunes Festival" will be filtered if the user selects control 306.

In accordance with one or more embodiments, a new message can be identified as similar to message 314 by comparing one or more fields of the new message, e.g., content or values of one or more fields of the new message, to one or more corresponding fields of message 314, e.g., the content and/or values of the one or more corresponding fields of message 314. By way of a non-limiting example, the new message may be considered to be similar to message 314 where one or more fields of the new message are determined to have the same or similar content to the one or more corresponding fields of message 314.

If the user selects either control 306 or control 308, the spam vote by the user can be used, in accordance with one or more embodiments, to update the user's spam predictor in the vertical learning step 104 and can be used in the horizontal learning step 106.

UI 302 also includes a listing of folders including the user's inbox folder 322 as well as spam folder 318 and gray spam folder 320. In accordance with one or more embodiments, a message predicted to be spam can be automatically moved to spam folder 318 based on the prediction, e.g., automatically moved from the user's inbox folder 322 to the user's spam folder 318. In accordance with one or more embodiments, a message predicted to be gray spam, or a message that is predicted to not be wanted by user, can be automatically moved to the gray spam folder 320 from another folder, such as the user's inbox folder 322, based on the prediction.

Figure 4:
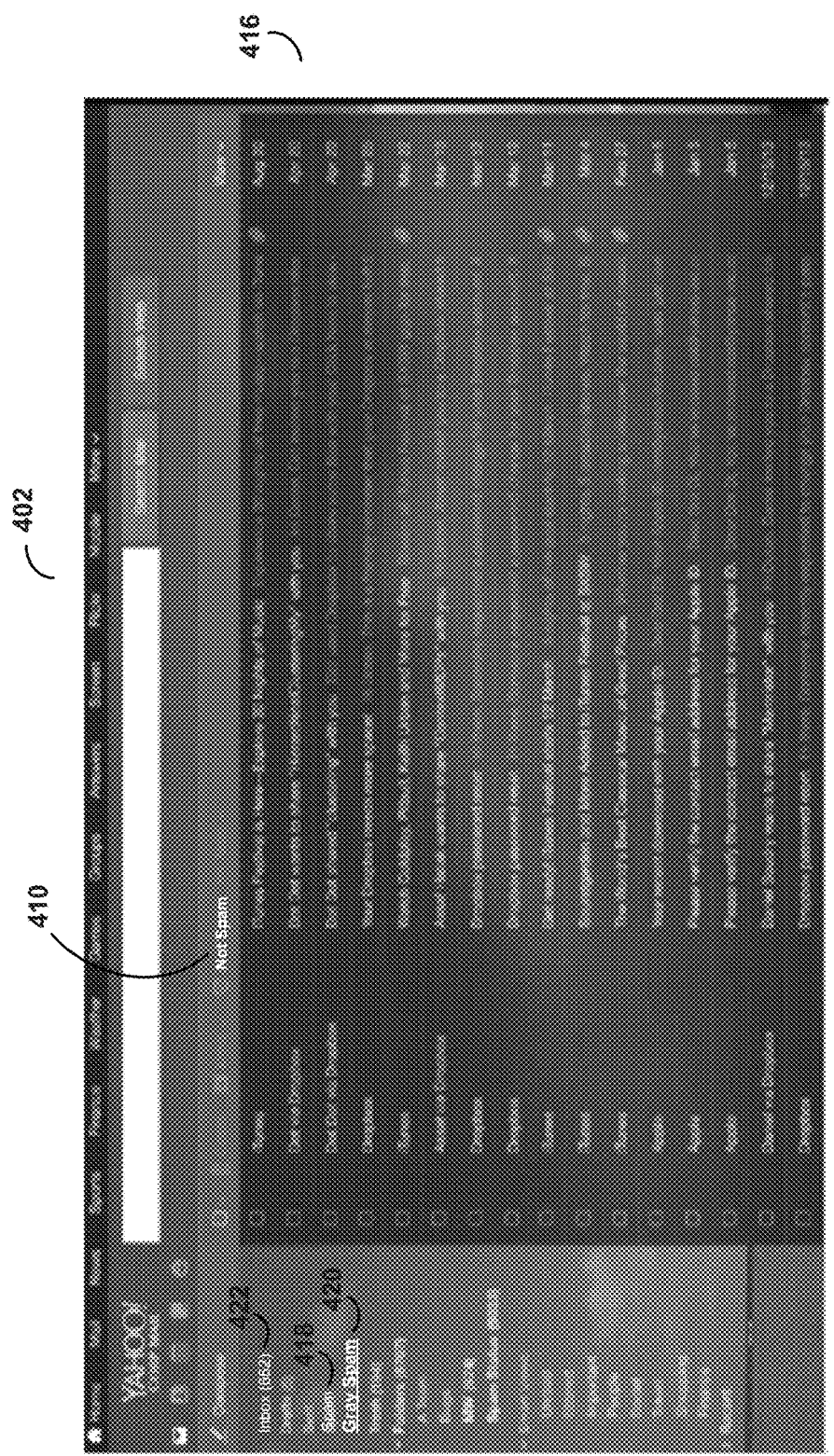

FIG. 4 provides a user interface example including a gray spam folder for use in accordance with one or more embodiments of the present disclosure. UI 402 comprises message display portion 416, which presents the user's gray spam messages as a list. As with UI 302, UI 402 comprises a messaging UI providing the user with an ability to perform various messaging operations, including without limitation read, compose, send, delete, etc. operations on one or more messages displayed in the message display portion 416. In addition, UI 402 provides an ability to select either of folders 418 and 420 to view, respectively, spam or gray spam messages for display in display portion 416 of UI 402. By way of a non-limiting example, the user may select a message, such as message 414, and select the "Not Spam" option 410 to indicate that a message identified as either gray spam, or a spam, is not spam. Such a message may be moved to another of the user's folders, such as the user's inbox folder 422.

If the user indicates that a message, or messages, is/are not spam or gray spam, the user's action can be used, in accordance with one or more embodiments, to update the user's personal predictor in the vertical learning step 104 and can be used in the horizontal learning step 106, as well.

UI 402 also includes a listing of folders including the user's inbox folder 422 as well as spam folder 418 and gray spam folder 420. In accordance with one or more embodiments, a message predicted to be spam can be automatically moved to spam folder 418 based on the prediction. In accordance with one or more embodiments, a message predicted to be gray spam, or not wanted by user, can be automatically moved to the gray spam folder 420 from another folder, such as the user's inbox folder 422, based on the prediction. Using UI 402, or UI 302, the user may open spam folder 418, or spam folder 318 in FIG. 3, or gray spam folder 420, or gray spam 320 in FIG. 3, and view the messages automatically identified as spam or gray spam.

Figure 5:
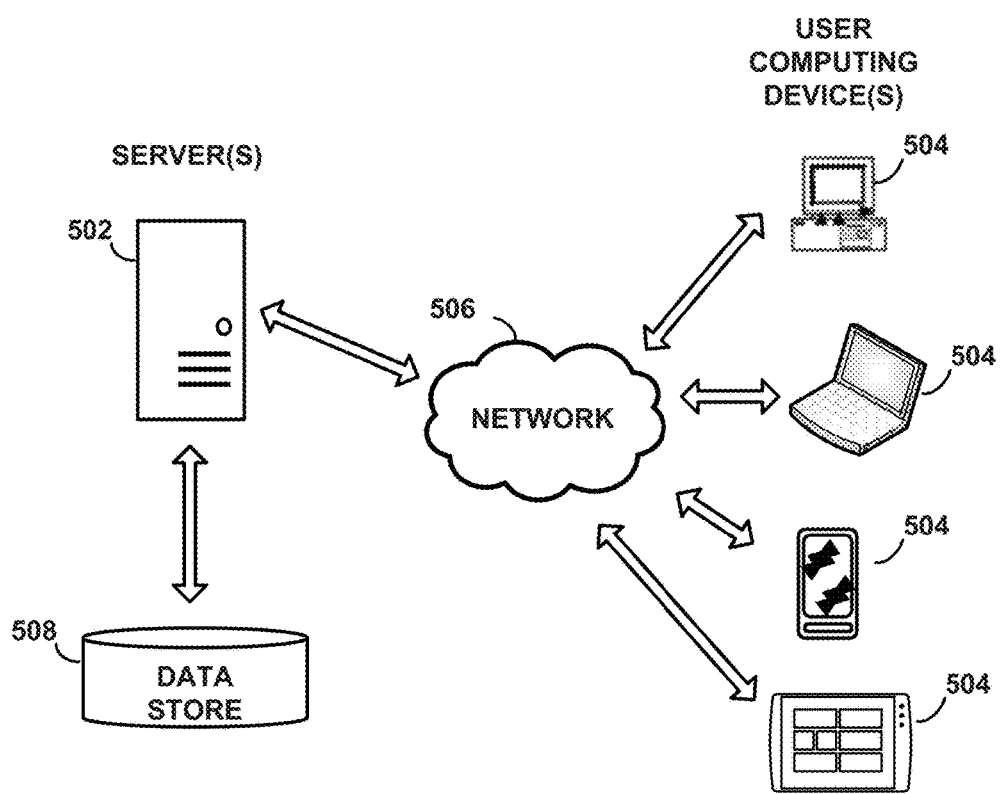
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 502 can be configured to execute program code, instructions, etc. to provide functionality in accordance with one or more embodiments of the present disclosure. The same or another computing device 502 may be configured to execute program code to implement functionality in accordance with one or more embodiments of the present disclosure.

Computing device 502 can serve content to user computing devices 504 using a browser application via a network 506. Data store 508 can be used to store program code to configure a server 502 to functionality in accordance with one or more embodiments of the present disclosure.

The user computing device 504 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
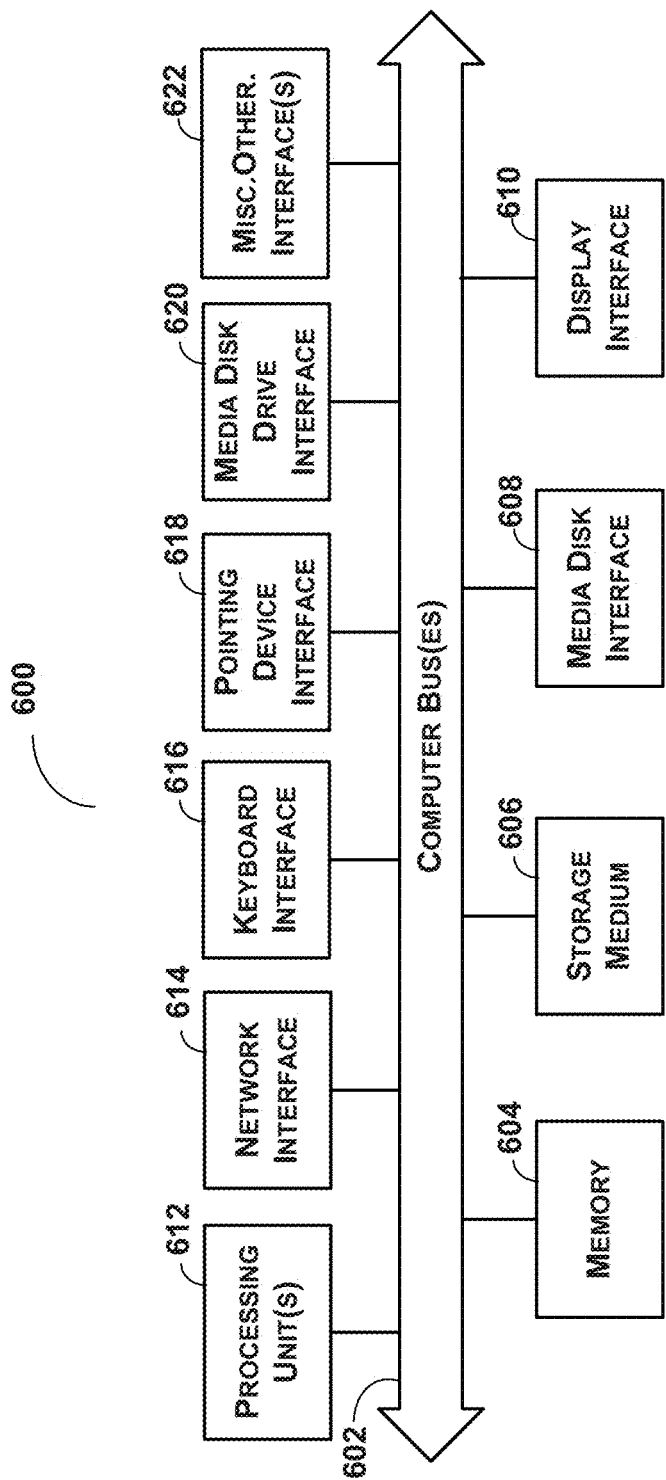
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

generating, by an electronic messaging server and for a user, training data, generating the training data comprising using actions of the user with respect to a plurality of the user's electronic mail messages;

generating, by the electronic messaging server and for the user, a personalized predictor, corresponding to an action, for use as a gray spam predictor for the user, the personalized predictor being generated using the user's training data;

determining, by the electronic messaging server, an activeness level of the user corresponding to the action, the activeness level of the user corresponding to the action being based on a number of observed examples of the action and an activeness threshold;

selecting, by the electronic messaging server and using the determined activeness level of the user, a horizontal model from a plurality of horizontal models trained using training data from a number of users, each horizontal model of the plurality of horizontal models corresponding to the action and a different activeness level;

regularizing, by the electronic messaging server and for the user, the personalized predictor, for use as the gray spam predictor, the regularizing using the selected horizontal model;

automatically making a prediction, by the electronic messaging server and for the user, whether or not a new electronic mail message of the user is unwanted by the user using the gray spam predictor personalized for the user and regularized using the selected horizontal model associated with the activeness level determined for the user; and automatically performing, by the electronic messaging server and for the user, at least one operation on the new electronic mail message if the prediction indicates that the new electronic mail message is unwanted by the user.

2. The method of claim 1, the automatically making a prediction further comprising:

determining, by the electronic messaging server and for the new electronic mail message, a confidence in the prediction, the at least one operation on the new electronic mail message selected from a plurality of operations based on the determined confidence level.

3. The method of claim 2, the automatically performing at least one operation on the new electronic mail message further comprising:

making a determination, by the electronic messaging server and for the user, that the determined confidence level is sufficient to move the new electronic mail message to a gray spam folder; and automatically moving, by the electronic messaging server and for the user, the new electronic mail message to the gray spam folder based on the determination.

4. The method of claim 2, the automatically performing at least one operation on the new electronic mail message further comprising:

making a determination, by the electronic messaging server and for the user, that the determined confidence level is sufficient to move the new electronic mail message to a black spam folder; and automatically moving, by the electronic messaging server and for the user, the new electronic mail message to the black spam folder based on the determination.

5. The method of claim 2, the automatically performing at least one operation on the new electronic mail message further comprising:

making a determination, by the electronic messaging server and for the user, that the determined confidence level is insufficient to identify the new electronic mail message as gray spam; and requesting, by the electronic messaging server using a dialog user interface, input from the user indicating whether or not the user considers the new electronic mail message and any other electronic mail message similar to the new electronic mail message to be spam.

6. The method of claim 5, the method further comprising:

identifying, by the electronic messaging server, the other electronic mail message as being similar to the new electronic mail message by comparing one or more fields of the other electronic message to one or more corresponding fields of the new electronic mail message.

7. The method of claim 6, further comprising:

identifying, by the electronic messaging server, a message cluster, any electronic mail messages belonging to the message cluster being similar to the new electronic mail message, similar messages having at least one field with content that is at least similar;

identifying, by the electronic messaging server, an unfiltered electronic mail message belonging to the message cluster;

automatically performing, by the electronic messaging server and for the unfiltered electronic mail message, a message filtering action in accordance with the user's indicated preference for acting on other electronic mail messages similar to the new electronic mail message.

8. The method of claim 7, the user's indicated preference comprising marking similar electronic mail messages as spam.

9. The method of claim 7, further comprising:

determining, by the electronic messaging server, a measure of quality for each message cluster of a plurality message clusters;

ranking, by the electronic messaging server, the plurality of message clusters based on each message cluster's respective measure of quality; and identifying, by the electronic messaging server, the message cluster to which the unfiltered electronic mail message belongs, the message cluster identified for the unfiltered electronic mail message being the highest ranking cluster having some measure of similarity to the unfiltered electronic mail message.

10. The method of claim 1, generating the training data further comprising:

generating, by the electronic messaging server and for the user, a plurality of samples, each sample corresponding to an electronic mail message of the user's plurality and comprising a feature vector and an action label indicating whether or not the user took the action on the electronic mail message.

11. The method of claim 10, the feature vector comprising local features generated using fields of the electronic mail message and a number of global features generated using information collected from a corpus of users' electronic mail messages.

12. The method of claim 1, the training data comprising, for each observed example corresponding to an electronic mail message of the plurality of the user's electronic mail messages, a feature vector and an action label indicating whether or not the user took the action on the electronic mail message.

13. The method of claim 1, further comprising:
selecting, by the electronic messaging server and for the action, a number of electronic mail messages of a plurality of users, the selected electronic mail messages representing an average user;
generating, by the electronic messaging server, average-user training data using the selected number of electronic mail messages of the plurality of users and the behavior of the plurality of users with respect to the action and the selected electronic mail messages;
generating, by the electronic messaging server, an average-user horizontal model for the action using the average-user training data; and
making a determination, by the electronic messaging server using the determined activeness level, that the user is a light electronic mail message user with respect to the action;
the selecting the horizontal model from the plurality of horizontal models comprising selecting the average-user horizontal model based on the determination, using the determined activeness level, that the user is a light electronic mail message user with respect to the action; and
the regularizing comprising regularizing, by the electronic messaging server, the user's personalized predictor for the action using the average-user horizontal model for the action.

14. The method of claim 1, further comprising:
generating, by the electronic messaging server and for the action, a plurality of personalized predictors for a plurality of users, each personalized predictor corresponds to a given user, of the plurality of users, and is trained using training data generated using a plurality of electronic mail messages of the given user and the behavior of the given user with respect to the action and the plurality of electronic mail messages of the given user;
grouping, by the electronic messaging server and for the action, personalized predictors of the plurality such that similar personalized predictors are assigned to the same personalized predictor group;
generating, by the electronic messaging server and for the action, a latent type predictor for each personalized predictor group;
making a determination, by the electronic messaging server and using the determined activeness level of the user, that the user is an active electronic mail message user with respect to the action;
assigning, by the electronic messaging server, the user to an identified personalized predictor group for the action, the identified personalized predictor group being identified using the user's personalized predictor for the action and the latent user-type predictor generated for the identified personalized predictor group, the identified personalized predictor group having a determined minimum distance, relative to any other personalized predictor group, between its latent user-type predictor and the user's personalized predictor for the action; and
the regularizing, by the electronic messaging server, the user's personalized predictor further comprising regularizing the user's personalized predictor using the identified personalized predictor group's latent-type predictor, such that the user's regularized personalized predictor for the action is a combination of the user's personalized predictor for the action and the identified personalized predictor group's latent-type predictor.

15. The method of claim 1, further comprising:
automatically identifying, by the electronic messaging server for a spam engine, a sender's message as gray spam for a number of users using each user's personalized predictor, so that the sender is not identified as a spam sender.

16. An electronic messaging server comprising:
a processor;
a storage medium for tangibly storing thereon program logic for execution by the processor, the stored program logic comprising:
generating logic executed by the processor for generating, for a user, training data, generating the training data comprising using actions of the user with respect to a plurality of the user's electronic mail messages;
generating logic executed by the processor for generating, for the user, a personalized predictor, corresponding to an action, for use as a gray spam predictor for the user, the personalized predictor being generated using the user's training data;
determining logic executed by the processor for determining an activeness level of the user corresponding to the action, the activeness level of the user corresponding to the action being based on a number of observed examples of the action and an activeness threshold;
selecting logic executed by the processor for selecting, using the determined activeness level of the user, a horizontal model from a plurality of horizontal models trained using training data from a number of users, each horizontal model of the plurality of horizontal models corresponding to the action and a different activeness level;
regularizing logic executed by the processor for regularizing, for the user, the personalized predictor, for use as the gray spam predictor, the regularizing using the selected horizontal model;
prediction making logic executed by the processor for automatically making a prediction, for the user, whether or not a new electronic mail message of the user is unwanted by the user using the gray spam predictor personalized for the user and regularized using the selected horizontal model associated with the activeness level determined for the user; and
preforming logic executed by the processor for automatically performing, for the user, at least one operation on the new electronic mail message if the prediction indicates that the new electronic mail message is unwanted by the user.

17. The electronic messaging server of claim 16, the making logic for automatically making a prediction further comprising:
determining logic executed by the processor for determining, for the new electronic mail message, a confidence in the prediction, the at least one operation on the new electronic mail message selected from a plurality of operations based on the determined confidence level.

18. The electronic messaging server of claim 17, the performing logic for automatically performing at least one operation on the new electronic mail message further comprising:
making logic executed by the processor for making a determination, for the user, that the determined confidence level is sufficient to move the new electronic mail message to a gray spam folder; and moving logic executed by the processor for automatically moving, for the user, the new electronic mail message to the gray spam folder based on the determination.

19. The electronic messaging server of claim 17, the performing logic for automatically performing at least one operation on the new electronic mail message further comprising:

making logic executed by the processor for making a determination, for the user, that the determined confidence level is sufficient to move the new electronic mail message to a black spam folder; and moving logic executed by the processor for automatically moving, for the user, the new electronic mail message to the black spam folder based on the determination.

20. The electronic messaging server of claim 17, the performing logic for automatically performing at least one operation on the new electronic mail message further comprising:

making logic executed by the processor for making a determination, for the user, that the determined confidence level is insufficient to identify the new electronic mail message as gray spam; and requesting logic executed by the processor for requesting, using a dialog user interface, input from the user indicating whether or not the user considers the new electronic mail message and any other electronic mail message similar to the new electronic mail message to be spam.

21. The electronic messaging server of claim 20, the logic for requesting further comprising:

identifying logic executed by the processor for identifying the other electronic mail message as being similar to the new electronic mail message by comparing one or more fields of the other electronic message to one or more corresponding fields of the new electronic mail message.

22. The electronic messaging server of claim 21, the stored program logic further comprising:

identifying logic executed by the processor for identifying a message cluster, any electronic mail messages belonging to the message cluster being similar to the new electronic mail message, similar messages having at least one field with content that is at least similar;

identifying logic executed by the processor for identifying an unfiltered electronic mail message belonging to the message cluster; and performing logic executed by the processor for automatically performing, for the unfiltered electronic mail message, a message filtering action in accordance with the user's indicated preference for acting on other electronic mail messages similar to the new electronic mail message.

23. The electronic messaging server of claim 22, the user's indicated preference comprising marking similar electronic mail messages as spam.

24. The electronic messaging server of claim 22, the stored program logic further comprising determining logic executed by the processor for determining a measure of quality for each message cluster of a plurality message clusters;

ranking logic executed by the processor for ranking the plurality of message clusters based on each message cluster's respective measure of quality; and identifying logic executed by the processor for identifying the message cluster to which the unfiltered electronic mail message belongs, the message cluster identified for the unfiltered electronic mail message being the highest ranking cluster having some measure of similarity to the unfiltered electronic mail message.

25. The electronic messaging server of claim 16, the generating logic for generating the training data further comprising:

generating logic executed by the processor for generating, for the user, a plurality of samples, each sample corresponding to an electronic mail message of the user's plurality and comprising a feature vector and an action label indicating whether or not the user took the action on the electronic mail message.

26. The electronic messaging server of claim 25, the feature vector comprising local features generated using fields of the electronic mail message and a number of global features generated using information collected from a corpus of users' electronic mail messages.

27. The electronic messaging server of claim 16, the training data comprising, for each observed example corresponding to an electronic mail message of the plurality of the user's electronic mail messages, a feature vector and an action label indicating whether or not the user took the action on the electronic mail message.

28. The electronic messaging server of claim 16, the stored program logic further comprising:

selecting logic executed by the processor for selecting, for the action, a number of electronic mail messages of a plurality of users, the selected electronic mail messages representing an average user;

generating logic executed by the processor for generating average-user training data using the selected number of electronic mail messages of the plurality of users and the behavior of the plurality of users with respect to the action and the selected electronic mail messages;

generating logic executed by the processor for generating an average-user horizontal model for the action using the average-user training data; and making logic executed by the processor for making a determination, using the determined activeness level, that the user is a light electronic mail message user with respect to the action;

the selecting logic executed by the processor for selecting the horizontal model from the plurality of horizontal models comprising selecting logic executed by the processor for selecting the average-user horizontal model based on the determination, using the determined activeness level, that the user is a light electronic mail message user with respect to the action;

the regularizing logic executed by the processor for regularizing further comprising regularizing logic executed by the processor for regularizing the user's personalized predictor for the action using the average-user horizontal model for the action.

29. The electronic messaging server of claim 16, the stored program logic further comprising:

generating logic executed by the processor for generating, for the action, a plurality of personalized predictors for a plurality of users, each personalized predictor corresponds to a given user, of the plurality of users, and is trained using training data generated using a plurality of electronic mail messages of the given user and the behavior of the given user with respect to the action and the plurality of electronic mail messages of the given user;

grouping logic executed by the processor for grouping, for the action, personalized predictors of the plurality such that similar personalized predictors are assigned to the same personalized predictor group;

generating logic executed by the processor for generating, for the action, a latent-type predictor for each personalized predictor group;

making logic executed by the processor for making a determination that the user is an active electronic mail message user with respect to the action;

assigning logic executed by the processor for assigning the user to an identified personalized predictor group for the action, the identified personalized predictor group being identified using the user's personalized predictor for the action and the latent-type predictor generated for the identified personalized predictor group, the identified personalized predictor group having a determined minimum distance, relative to any other personalized predictor group, between its latent-type predictor and the user's personalized predictor for the action; and the regularizing logic executed by the processor for regularizing the user's personalized predictor further comprising regularizing the user's personalized predictor using the identified personalized predictor group's latent-type predictor, such that the user's regularized personalized predictor for the action is a combination of the user's personalized predictor for the action and the identified personalized predictor group's latent-type predictor.

30. The electronic messaging server of claim 16, the stored program logic further comprising:
identifying logic executed by the processor for automatically identifying, for a spam engine, a sender's message as gray spam for a number of users using each user's personalized predictor, so that the sender is not identified as a spam sender.

31. A computer readable non-transitory storage medium for tangibly storing thereon computer readable instructions that when executed by an electronic messaging server, perform functions comprising:
generating, for a user, training data, generating the training data comprising using actions of the user with respect to a plurality of the user's electronic mail messages;
generating, for the user, a personalized predictor, corresponding to the action, for use as a gray spam predictor for the user, the personalized predictor being generated using the user's training data;
determining an activeness level of the user corresponding to an action, the activeness level of the user being based on a number of observed examples of the action and an activeness threshold;
selecting, using the determined activeness level of the user, a horizontal model from a plurality of horizontal models trained using training data from a number of users, each horizontal model of the plurality of horizontal models corresponding to the action and a different activeness level;
regularizing, for the user, the personalized predictor, for use as the gray spam predictor, the regularizing using the selected horizontal model;
automatically making a prediction, for the user, whether or not a new electronic mail message of the user is unwanted by the user using the gray spam predictor personalized for the user and regularized using the selected horizontal model associated with the activeness level determined for the user; and
automatically performing, for the user, at least one operation on the new electronic mail message if the prediction indicates that the new electronic mail message is unwanted by the user.

32. The medium of claim 31, making a prediction further comprising:
determining, for the new electronic mail message, a confidence in the prediction, the at least one operation on the new electronic mail message selected from a plurality of operations based on the determined confidence level.

33. The medium of claim 32, automatically performing at least one operation on the new electronic mail message further comprising:
making a determination, for the user, that the determined confidence level is sufficient to move the new electronic mail message to a gray spam folder; and
automatically moving, for the user, the new electronic mail message to the gray spam folder based on the determination.

34. The medium of claim 32, automatically performing at least one operation on the new electronic mail message further comprising:
making a determination, for the user, that the determined confidence level is sufficient to move the new electronic mail message to a black spam folder; and
automatically moving, for the user, the new electronic mail message to the black spam folder based on the determination.

35. The medium of claim 32, automatically performing at least one operation on the new electronic mail message further comprising:
making a determination, for the user, that the determined confidence level is insufficient to identify the new electronic mail message as gray spam; and
requesting, using a dialog user interface, input from the user indicating whether or not the user considers the new electronic mail message and any other electronic mail message similar to the new electronic mail message to be spam.

36. The medium of claim 35, further comprising:
identifying the other electronic mail message as being similar to the new electronic mail message by comparing one or more fields of the other electronic message to one or more corresponding fields of the new electronic mail message.

37. The medium of claim 36, further comprising:
identifying a message cluster, any electronic mail messages belonging to the message cluster being similar to the new electronic mail message, similar messages having at least one field with content that is at least similar;
identifying an unfiltered electronic mail message belonging to the message cluster; and
automatically performing, for the unfiltered electronic mail message, a message filtering action in accordance with the user's indicated preference for acting on other electronic mail messages similar to the new electronic mail message.

38. The medium of claim 37, the user's indicated preference comprising marking similar electronic mail messages as spam.

39. The medium of claim 37, further comprising:
determining a measure of quality for each message cluster of a plurality message clusters;
ranking the plurality of message clusters based on each message cluster's respective measure of quality; and identifying the message cluster to which the unfiltered electronic mail message belongs, the message cluster identified for the unfiltered electronic mail message being the highest ranking cluster having some measure of similarity to the unfiltered electronic mail message.

40. The medium of claim 31, generating the training data further comprising:
generating, for the user, a plurality of samples, each sample corresponding to an electronic mail message of the user's plurality and comprising a feature vector and an action label indicating whether or not the user took the action on the electronic mail message.

41. The medium of claim 40, the feature vector comprising local features generated using fields of the electronic mail message and a number of global features generated using information collected from a corpus of users' electronic mail messages.

42. The medium of claim 31, the training data comprising, for each observed example corresponding to an electronic mail message of the plurality of the user's electronic mail messages, a feature vector and an action label indicating whether or not the user took the action on the electronic mail message.

43. The medium of claim 31, further comprising:
selecting, for the action, a number of electronic mail messages of a plurality of users, the selected electronic mail messages representing an average user;
generating average-user training data using the selected number of electronic mail messages of the plurality of users and the behavior of the plurality of users with respect to the action and the selected electronic mail messages;
generating an average-user horizontal model for the action using the average-user training data; and
making a determination, using the determined activeness level, that the user is a light electronic mail message user with respect to the action;
the selecting the horizontal model from the plurality of horizontal models comprising selecting the average-user horizontal model based on the determination, using the determined activeness level, that the user is a light electronic mail message user with respect to the action; and
the regularizing comprising regularizing the user's personalized predictor for the action using the average-user horizontal model for the action.

44. The medium of claim 31, further comprising:
generating, for the action, a plurality of personalized predictors for a plurality of users, each personalized predictor of the plurality corresponds to a given user, of the plurality of users, and is trained using training data generated using a plurality of electronic mail messages of the given user and the behavior of the given user with respect to the action and the plurality of electronic mail messages of the given;
grouping, for the action, personalized predictors of the plurality such that similar personalized predictors are assigned to the same personalized predictor group;
generating, for the action, a latent type predictor for each personalized predictor group;
making a determination, using the determined activeness level of the user, that the user is an active electronic mail message user with respect to the action;
assigning the user to an identified personalized predictor group for the action, the identified personalized predictor group being identified using the user's personalized predictor for the action and the latent type predictor generated for the identified personalized predictor group, the identified personalized predictor group having a determined minimum distance, relative to any other personalized predictor group, between its latent type predictor and the user's personalized predictor for the action; and
the regularizing the user's personalized predictor further comprising regularizing the user's personalized predictor using the identified personalized predictor group's latent type predictor, such that the user's regularized personalized predictor for the action is a combination of the user's personalized predictor for the action and the identified personalized predictor group's latent type predictor.

45. The medium of claim 31, further comprising:
automatically identifying, for a spam engine, a sender's message as gray spam for a number of users using each user's personalized predictor, so that the sender is not identified as a spam sender.

* * * * *